Aug. 2, 1966  A. VOGE ETAL  3,263,508
GYROSCOPE
Filed Aug. 27, 1964  3 Sheets-Sheet 2

FIG. 2

INVENTORS.
ANDREW VOGE
JAMES BJORDAHL
BY
ATTORNEY.

Aug. 2, 1966    A. VOGE ETAL    3,263,508
GYROSCOPE
Filed Aug. 27, 1964    3 Sheets-Sheet 3
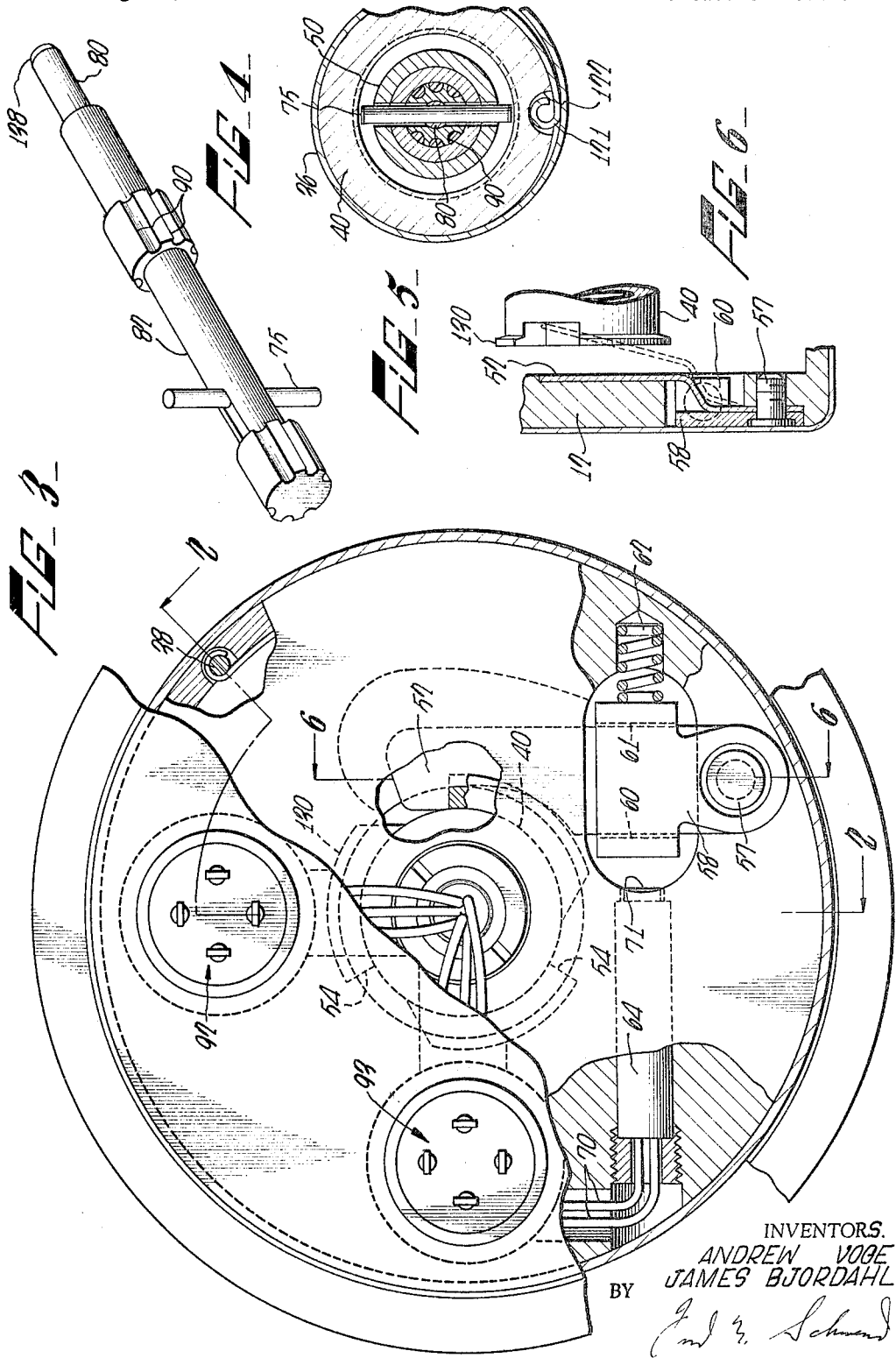
INVENTORS.
ANDREW VOGE
JAMES BJORDAHL
BY
ATTORNEY.

United States Patent Office 3,263,508
Patented August 2, 1966

3,263,508
GYROSCOPE
Andrew Voge, Canoga Park, and James Bjordahl, Temple City, Calif., assignors to Clary Corporation, San Gabriel, Calif., a corporation of California
Filed Aug. 27, 1964, Ser. No. 392,425
10 Claims. (Cl. 74—5.12)

This invention relates to gyroscopes and has particular reference to spring driven gyroscopes in which the rotor is driven up to a relatively high speed within a short period of time by the spring and is then allowed to run free while exercising a controlling or indicating function. This type of gyroscope is particularly valuable in controlling guided missiles having a relatively short flight time.

In relatively small missiles, severe limitations are placed on the size and weight of the gyroscope while still requiring a high degree of accuracy and reliability. On the other hand, since such missiles are expendable, it is highly desirable that the gyroscope be inexpensive while being rugged enough to withstand rough handling and the shock of launching the missile.

By providing a housing or base at one end of the gyroscope for supporting all of the components thereof, and by providing an internal gimbal mount such as that disclosed and claimed in the copending application of G. F. East, Serial No. 301,038, filed Aug. 9, 1963, the rotor diameter and consequently the angular momentum may be made as large as possible within the confines of the gyroscope package without materially increasing the overall weight. However, such an arrangement introduces certain problems of construction including that of properly caging and uncaging the rotor and that of leading the various conductors for the attitude pick-off devices from the gimbal mounting to the base.

It therefore becomes a principal object of the present invention to provide a spring driven gyroscope which can be made in a very small size and yet which is highly accurate and reliable.

Another object is to provide a gyroscope of the above type which is light in weight and yet rugged enough to withstand external shocks due to launching and the like operations.

Another object is to provide a gyroscope of the above type which is inexpensive to manufacture and assemble.

Another object is to eliminate the need for a traveling nut device for uncaging the rotor after it is run up to operating speed.

The manner in which the above and other objects of the invention are accomplished will be readily understood on reference to the following specification when read in conjunction with the accompanying drawings, wherein:

FIG. 2 is a sectional view similar to FIG. 1 but illustrating the drive mechanism in retracted position, and is taken substantially along the line 2—2 of FIG. 3.

FIG. 3 is a transverse sectional view, with parts broken away, of the gyroscope.

FIG. 4 is a perspective view of the caging pin housing sleeve.

FIG. 5 is a transverse sectional view taken along the line 5—5 of FIG. 2.

FIG. 6 is a transverse sectional view taken along the line 6—6 of FIG. 3.

Figure 1:
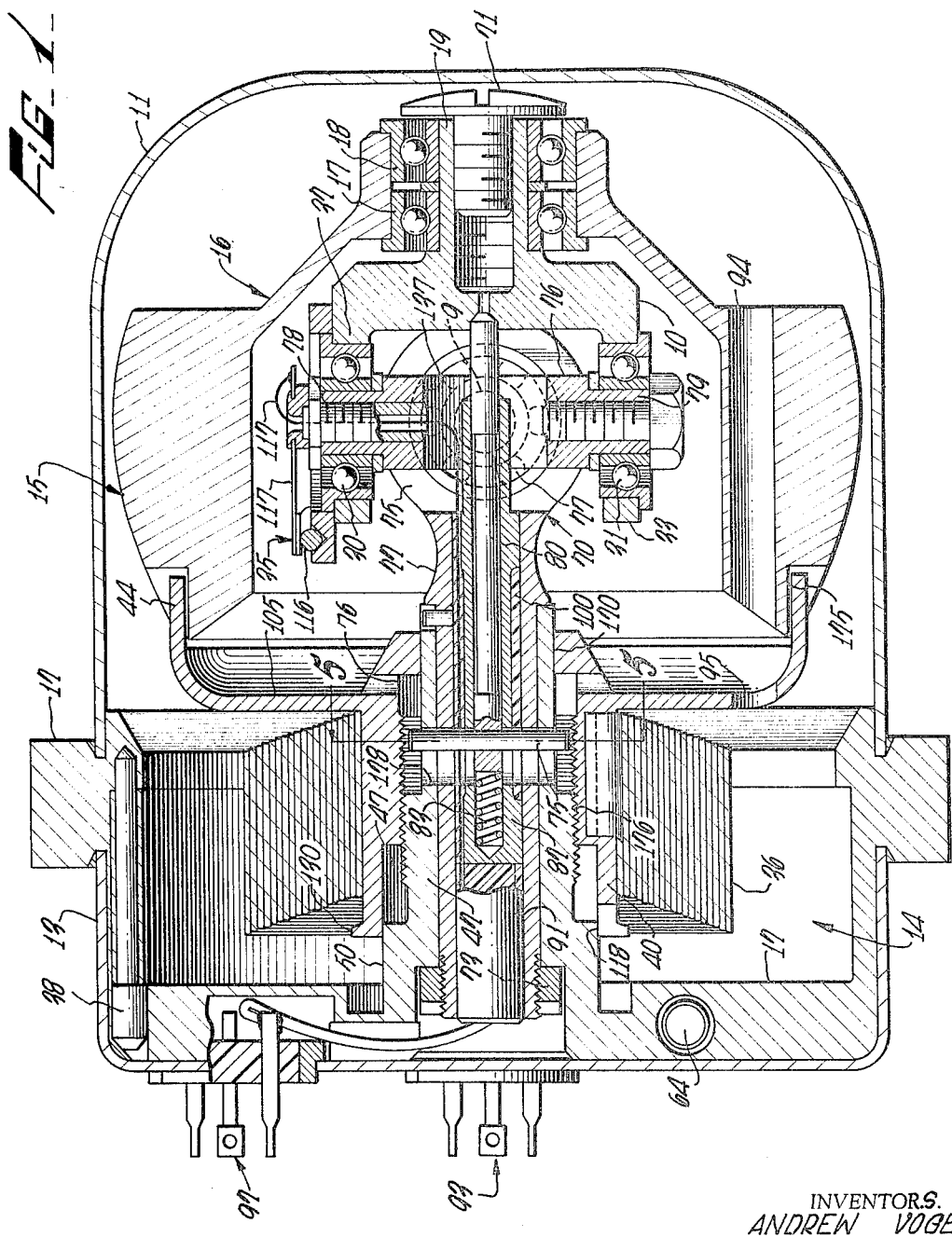
FIG. 1 is a longitudinal sectional view to a gyroscope embodying a preferred form of the present invention and illustrating the drive mechanism in energized condition.

Referring to the drawings, the gyroscope comprises a cup-shaped case member 11 secured to one side of the hollow bulkhead member 12, the latter forming a base for supporting the gyroscope components. An end cap 13 is secured to the opposite side of the member 12. Suitable means (not shown) are provided for attaching the bulkhead member to a supporting frame.

The case member 11, end cap 13 and bulkhead member 12 serve to seal the gyroscope and to form a drive compartment 14 within the bulkhead member and a rotor compartment 15 within the member 11.

A hollow rotor generally indicated at 16 is mounted in the rotor compartment and is rotatably mounted through ball bearings 17 and 18 on the shaft portion 19 of a gimbal member 10 located within the rotor. The bearings 17 and 18 are retained on the shaft portion by a screw 21.

A tubular gimbal support member 22 is rigidly secured within a tubular extension or hub 42 extending from the center of the bulkhead member 12. The member 22 is secured in place by a nut 23 threaded thereon and is bifurcated at its opposite end to form two spaced yoke arms, one of which is shown at 25. The latter arms are pivotally supported by coaxially extending shaft sections, one of which is indicated at 9 formed on a center block 26 through ball bearings, one of which is partly illustrated at 27. The center block also supports the aforementioned gimbal member 10 through coaxial shaft sections 28 and 29 which are pivotally supported by ball bearings 30 and 31 mounted in spaced arms 32 and 33 of the gimbal member 10.

The axis of the shaft sections 28 and 29 extend perpendicular to the first mentioned shaft sections 9 and intersect the spin axis of the rotor 16 to permit universal movement of the gyroscope relative to such spin axis.

Suitable attitude pick-off devices, one of which is generally indicated at 35, are carried by the gimbal member 10 and the support member 22 to indicate the angular position of the gyroscope relative to the spin axis.

Each pick-off device is illustrated as comprising an electrical resistance element 116 mounted on the respective gimbal member. A wiper brush 117 forming a potentiometer arm is mounted on an extension of the associated shaft section, i.e. 28, and is suitably connected to terminal connections as will be described later.

Describing now the spring drive motor, the latter is contained in the compartment 14 and comprises a spiral torsion spring 36 which is attached at its outer end by looping the same around a pin 38 fitted into a hole in the bulkhead member 14 (see FIG. 3). The spring is attached at its inner end to a hollow spindle or drive member 40 which is rotatably mounted at 118 and 120 adjacent its opposite ends on the hollow hub 42.

As shown particularly in FIGS. 1 and 4, the inner end of the spring 35 is formed into a small coil 121 which is fitted within a semi-cylindrical notch 122 formed in the drive member.

The inner end of the drive member 40 has a radially extending flange 105 terminating in a pair of diametrically opposed drive teeth 44 which engage in mating notches 125 formed in the rotor when the spring motor is in its energized condition.

The drive member is threadably connected at 126 to the hub 42 and upon winding the spring into its energized condition shown at FIG. 1 it is moved longitudinally to couple the drive teeth 44 with the rotor.

The spring 36 is maintained in energized condition by a resilient pawl 52 (FIGS. 3 and 6) which is engageable with any of the three equi-spaced notches 54 formed in the drive member 40.

The pawl 52 is pivotally mounted on a pivot screw 57 secured to the bulkhead 12. The screw also pivotally supports a member 58 having ears 60 and 61 which straddle the pawl.

As best shown in FIG. 3 the pawl is normally held in pawling condition by a compression spring 62 which is fitted in an opening in the bulkhead 12 and engages the ear 61 of the member 58.

An explosive powder squib 64 is fitted in an opening formed in the bulkhead 12 in axial alignment with the spring 62. The squib 64 is fired by applying an electrical charge through conductors 70 immediately prior to launch time. This forces a small piston 71 to the right in FIG. 3, thereby rocking the member 58 and pawl 52 clockwise to release the drive member. As this occurs, the spring 36 unwinds and the drive member 40 and rotor are rapidly brought up to proper speed. As the drive member moves axially toward its position shown in FIG. 2, and toward the end of its travel, a shoulder 76 thereon picks up a cross pin 75, moving it along elongated slots 128 formed in the hub 42 and member 22. The pin 75 is connected to an axially slideable caging pin 80 which is slideably mounted in a sleeve 81 fixed within the member 22. The pin 80 extends through an opening 137 in the center block 26 and has a conical tip 138 normally engaging a mating hole in the gimbal member 10. Thus, the caging pin 80 is moved against the action of a compression spring 83, out of caging engagement with the gimbal member. Such disengagement will occur shortly after the drive teeth 44 become disengaged from the rotor.

In order to guide the leads, i.e. 112, from the attitude pick-off devices, i.e. 35, a series of longitudinally extending grooves 90 (FIG. 4) are formed in two spaced enlarged diameter portions of the sleeve 82. Such grooves are aligned with corresponding grooves in a plug member 91 also fixed within the member 22.

The conductors are retained in the slots 90 by a suitable plastic bonding material 100 which incapsulates the various conductors which, after passing along the sleeve 82 and plug member 91, are connected to suitable terminal connectors 92 and 93.

In order to wind the spring 36, the case 11 is removed and a suitable tool is fitted in holes 94 and 95 of the rotor and drive member respectively. As the tool is rotated the drive member will move axially toward the rotor and the pawl 61 will follow. For this purpose, a flange 130 is formed on the end of the drive member 40 and is effective to deflect upper end of the pawl laterally until it reaches its dotted line position shown in FIG. 6.

When the squib 64 is exploded to release the pawl, the latter will rock out of engagement with the aligned notch 54 and will then snap back to its initial position shown in full lines in FIG. 6, thus moving out of interference with the drive member.

The flange 105 serves to shield the rotor compartment 15 from heavy lubricating agents which may be applied to the spring 36 and which might otherwise affect the operation of the rotor, gimbal means and pick-off devices.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A gyroscope comprising a rotor having a first coupling part, gimbal means supporting said rotor for rotation about a spin axis and for movement about mutually perpendicular axes, a gyroscope base, a tubular extension integral with said base, said extension supporting said gimbal means, a rotatable drive member, said drive member having a second coupling part engageable with said first coupling part whereby to drive said rotor, means forming a screw threaded connection between said extension and said drive member for moving said drive member away from said rotor upon rotation of said drive member, a spring extending between said base and said drive member for rotating said drive member, and a caging pin slideable lengthwise in said tubular extension, said caging pin being normally in caging engagement with said gimbal means, and said drive member being effective to retract said caging pin from caging engagement upon a predetermined movement of said drive member away from said rotor.

2. A gyroscope according to claim 1 wherein said caging pin disengages from said gimbal means only after said second coupling part disengages from said first coupling part.

3. A gyroscope comprising a rotor having a first coupling part, gimbal means supporting said rotor for rotation about a spin axis and for movement about mutually perpendicular axes, a gyroscope base, a tubular extension integral with said base, said extension supporting said gimbal means, a drive member rotatably mounted on said extension, said drive member having a second coupling part engageable with said first coupling part whereby to drive said rotor, means responsive to rotation of said drive member for moving said drive member axially and away from said rotor upon rotation of said drive member, a spring extending between said base and said drive member for rotating said drive member, a caging pin slideable lengthwise in said tubular extension, said caging pin being normally in caging engagement with said gimbal means, and means controlled by said drive member for retracting said caging pin.

4. A gyroscope comprising a rotor having a first coupling part, gimbal means supporting said rotor for rotation about a spin axis and for movement about mutually perpendicular axes, a gyroscope base, a tubular extension integral with said base, said extension supporting said gimbal means, a rotatable drive member, said drive member having a second coupling part engageable with said first coupling part whereby to drive said rotor, means forming a screw threaded connection between said extension and said drive member for moving said drive member away from said rotor upon rotation of said drive member, a spring extending between said base and said drive member for rotating said drive member, a caging pin slideable lengthwise in said tubular extension, and spring means normally maintaining said caging pin in caging engagement with said gimbal means, said drive member being effective to retract said caging pin from caging engagement upon a predetermined movement of said drive member away from said rotor.

5. A gyroscope comprising a hollow rotor having a first coupling part, a gimbal support supporting said rotor for rotation about a spin axis, a universal pivot member within said rotor and pivotally supporting said support for movement about a second axis perpendicular to said spin axis and intersecting the center of mass and said spin axis of said rotor, a gyroscope base, a tubular extension integral with said base, said extension supporting said pivot member for movement about a third axis perpendicular to said spin axis and intersecting said center of mass, said third axis extending perpendicular to said second axis, a rotatable drive member screw threaded on said extension intermediate said base and said rotor, said drive member having a second coupling part engageable with said first coupling part whereby to drive said rotor, a spring extending between said base and said drive member for rotating said drive member, a caging pin slideable lengthwise in said extension, said caging pin being normally in caging engagement with said gimbal support, and said drive member being effective to retract said caging pin from caging engagement upon a predetermined movement of said drive member away from said rotor.

6. A gyroscope comprising a hollow rotor having a first coupling part, a gimbal support supporting said rotor for rotation about a spin axis, a universal pivot member within said rotor and pivotally supporting said support for movement about a second axis perpendicular to said spin axis and intersecting the center of mass and said spin axis of said rotor, a gyroscope base, a tubular extension integral with said base, said extension supporting said pivot member for movement about a third axis perpendicular to said spin axis and intersecting said center of mass, said third axis extending perpendicular to said second axis, a drive member rotatably and axially movable on said extension, means for moving said drive member axially of said extension upon rotation of said drive member, said drive member having a second coupling part engageable with said first coupling part whereby to drive said rotor, spring means extending between said base and said drive member for rotating said drive member, and a caging pin slideable lengthwise in said tubular extension, said caging pin being normally in caging engagement with said gimbal support, and said drive member being effective to retract said caging pin from caging engagement upon predetermined movement of said drive member away from said rotor.

7. A gyroscope comprising a rotor having a first coupling part, gimbal means supporting said rotor for rotation about a spin axis and for movement about mutually perpendicular axes, a gyroscope base, a tubular extension integral with said base, said extension supporting said gimbal means, a drive member rotatably mounted on said extension, said drive member having a second coupling part engageable with said first coupling part whereby to drive said rotor, means forming a screw threaded connection between said extension and said drive member for moving said drive member away from said rotor upon rotation of said drive member, a spiral spring extending between said base and said drive member for rotating said drive member, a caging pin slideable lengthwise in said tubular extension, said caging pin being normally in caging engagement with said gimbal means, said drive member being effective to retract said caging pin from caging engagement upon predetermined movement of said drive member away from said rotor, an electrical attitude pick-off device for indicating the position of said rotor about one of said perpendicular axes, said pick-off device including electrical conductors; and guideways extending longitudinally through said extension, said conductors extending through said guideways.

8. A gyroscope comprising a rotor having a first coupling part, gimbal means supporting said rotor for rotating about a spin axis and for movement about mutually perpendicular axes intersecting said spin axis, a gyroscope base, a tubular extension integral with said base, the axis of said extension intersecting said mutually perpendicular axes, said extension supporting said gimbal means, a drive member rotatably mounted on said extension, said drive member having a second coupling part engageable with said first coupling part whereby to drive said rotor, means forming a screw threaded connection between said extension and said drive member for moving said drive member away from said rotor upon rotation of said drive member, a spiral spring extending between said base and said drive member for rotating said drive member, a caging pin slideable lengthwise in said tubular extension, said caging pin being normally in caging engagement with said gimbal means, said drive member being effective to retract said caging pin from caging engagement upon predetermined movement of said drive member away from said rotor, a latch for latching said drive member against rotation, means supporting said latch for movement toward and away from said drive member, said latch being flexible in the direction of movement of said drive member, and said latch being effective upon release thereof from latching engagement with said drive member to flex away from said drive member in the direction of movement of said drive member.

9. A gyroscope comprising a rotor having a first coupling part, gimbal means supporting said rotor for rotation about a spin axis and for movement about mutually perpendicular axes, a gyroscope base, a tubular extension integral with said base, means supporting said gimbal means from said base, a rotatable drive member, said drive member having a second coupling part engageable with said first coupling part whereby to drive said rotor, means forming a screw threaded connection between said extension and said drive member for moving said drive member away from said rotor during rotation of said drive member, a spring extending between said base and said drive member for rotating said drive member, a caging pin slideable lengthwise in said tubular extension, said caging pin being normally in caging engagement with said gimbal means, and said drive member being effective to retract said caging pin from caging engagement upon a predetermined movement of said drive member away from said rotor.

10. A gyroscope comprising a rotor having a first coupling part, gimbal means supporting said rotor for rotation about a spin axis and for movement about mutually perpendicular axes, a gyroscope base, a tubular extension integral with said base, means supporting said gimbal means from said base, a rotatable drive member, said drive member having a second coupling part engageable with said first coupling part whereby to drive said rotor, means forming a screw threaded connection between said extension and said drive member for moving said drive member away from said rotor upon rotation of said drive member, a spring extending between said base and said drive member for rotating said drive member, a caging pin slideable lengthwise in said tubular extension, and spring means normally maintaining said caging pin in caging engagement with said gimbal means, said drive member being effective to retract said caging pin from caging engagement upon a predetermined movement of said drive member away from said rotor.

References Cited by the Examiner

UNITED STATES PATENTS

| | | | |
|---|---|---|---|
| 1,296,331 | 3/1919 | Shannard | 74—5.12 |
| 2,911,832 | 11/1959 | Thierman | 74—5.7 |

FRED C. MATTERN, JR., *Primary Examiner.*

J. D. PUFFER, *Assistant Examiner.*